Oct. 11, 1966  A. ABOLINS  3,278,176
SPLIT COMPRESSION SPRING FOR RADIAL ASSEMBLY
Filed Oct. 5, 1964
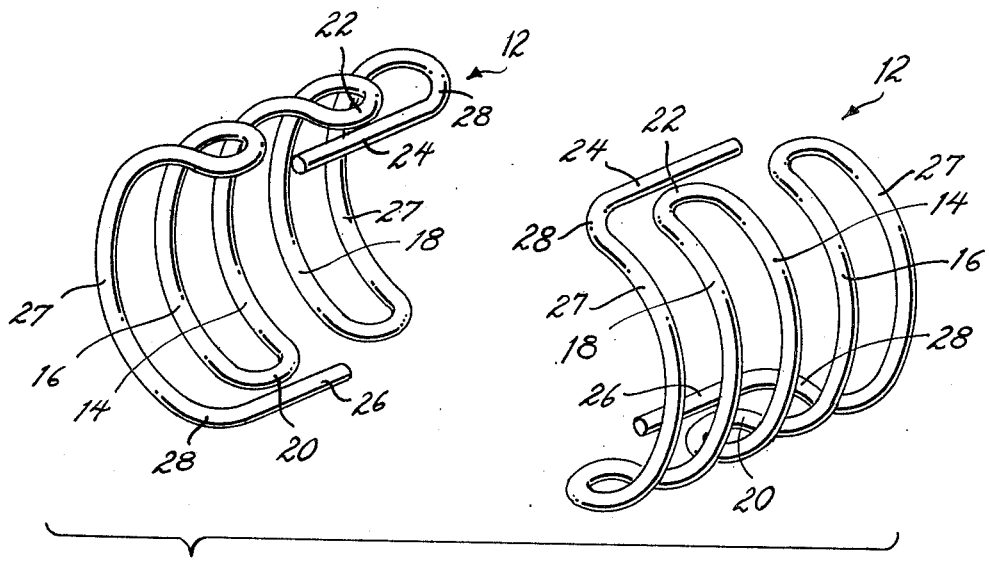
Fig. 1.
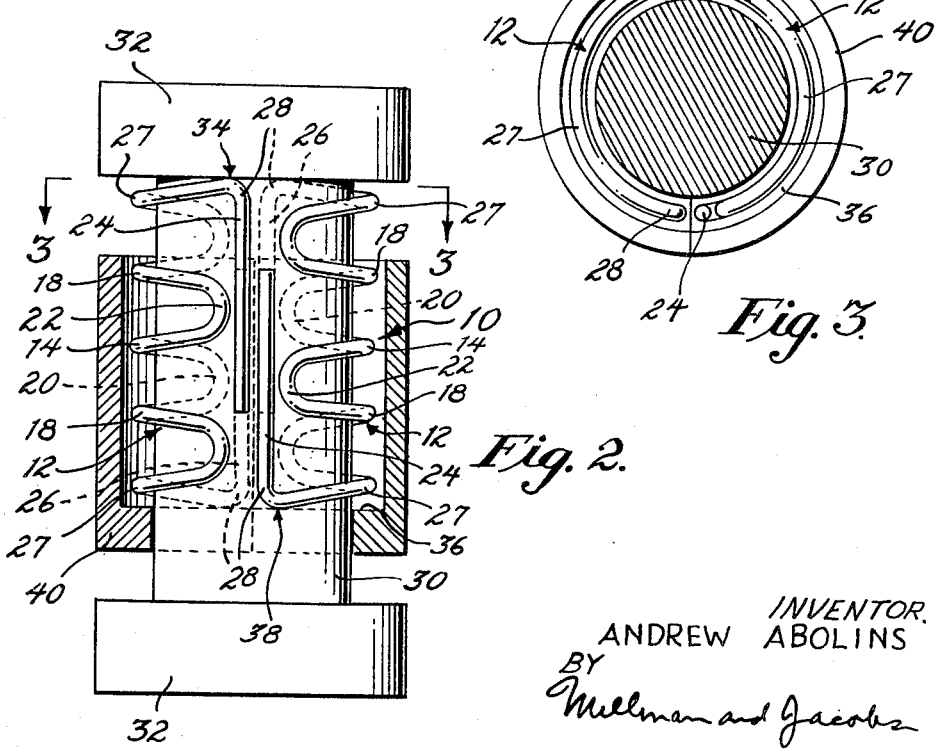
Fig. 2.
Fig. 3.
INVENTOR.
ANDREW ABOLINS
BY
Millman and Jacobs
ATTORNEYS.

United States Patent Office 3,278,176
Patented Oct. 11, 1966

3,278,176
SPLIT COMPRESSION SPRING FOR RADIAL ASSEMBLY
Andrew Abolins, 431 Crescent Ave., Penndel, Pa.
Filed Oct. 5, 1964, Ser. No. 401,358
8 Claims. (Cl. 267—1)

This invention relates generally to coil springs and particularly to coil springs for lateral mounting around a shaft.

In present day machinery there are many instances where coil springs are provided about spindles, stems or shafts which may be removed only by extensive dismantling of the surrounding machinery. There are various other instances where coil spring are mounted about spindles, stems or shafts which are located between members which are not readily removable. Consequently, in each of the above instances, placement of the conventional coil spring around or removal of the conventional coil spring from the shaft is often difficult and sometimes impossible. It is the primary object of the invention to provide an axially split coil spring which overcomes the aforementioned disadvantage residing in the conventional method of assembly and removal of coil springs as aforesaid.

Another object of the invention is to provide a coil spring which is adapted to be laterally or radially mounted around a spindle or shaft while retaining the resilient qualities of a conventional coil spring.

Another object of the invention is to provide a spring comprising two semi-cylindrical coil members adapted to be easily mounted adjacent each other about a spindle, stem or shaft and including means preferably in the form of coacting axially extending guards to prevent meshing of the coils of the semi-cylindrical members, the instant split spring having the advantage over the conventional helical compression spring in that it can be used effectively where the same is subjected both to compression and twisting action.

These and other objects of the invention will become more apparent as the following description proceeds in conjunction with the accompanying drawings wherein:

FIG. 1 is a perspective view of the instant invention;

FIG. 2 is an elevational view partially in section showing the invention assembled on a shaft, stem or spindle;

FIG. 3 is a sectional view taken on the line 3—3 of FIG. 2.

Specific reference is now made to the drawings in which similar reference characters are used for corresponding elements throughout.

Indicated generaly at 10 is the coil spring of the invention which is axially split and therefore comprises a pair of similar semi-cylindrical units 12. Each unit includes a plurality of serially connected hairpin convolutions consisting of axially spaced, circumferentially extending, substantially semi-circular rods, each intermediate rod 14 being integrally connected to front and rear adjacent rods 16 and 18 by opposite axially extending upper and lower webs 20 and 22, respectively.

Provided at diametrically opposite ends of each unit 12 are opposite axially extending rods 24 and 26, each of which is preferably an extension of each of the outermost coil rods 27 and is connected thereto by a bend 28 so that the rods extend inwardly of the member 12. The length of the rods 24 and 26 are such that they do not exceed the length of the unit 12 in its completely compressed condition, but together they extend across all of the convolutions when the spring is completely relaxed.

The assembly of the instant invention is manifest from FIGS. 2 and 3. Each semi-cylindrical unit 12 is easily positioned laterally or radially upon a double-headed shaft, spindle or stem 30. It will be noted that the upper and lower webs 20 and 22 are preferably staggered in assembly. One set of outermost rods bears against one of the heads 32 on the shaft as at 34 whereas the opposite set of outermost rods bears against the inner shoulder 36 as at 38 of a split sleeve 40 which confines and holds the semi-cylindrical units 12 together on the shaft, it being understood that a means is provided to retain the halves of the split sleeve together in assembly. The axially extending rods 24 and 26 of one unit 12 lie adjacent those of the complementary unit 12 to act as a means to prevent meshing of the coils of one unit 12 with the other. While the drawings illustrate a spring of substantially circular cross-section, it will be understood that the same can be made of a material having different cross-sections such as elliptical, square, rectangular, etc., and the term "rod" in the claims is used in this context to embrace these cross-sectional shapes.

It will be understood that the present invention may be employed wherever a compression coil spring is required. It has the advantage over a conventional helical compression spring in that it does not twist when being compressed. Moreover, unlike the conventional helical compression spring, because of its split construction in combination with the axial rods 24 and 26, the instant invention can be used in applications where it is subjected to both compression and twisting action, as in the horizontal container couplers shown and described in applicant's Patent No. 2,972,175 and in applicant's copending application Serial No. 396,669, filed September 15, 1964.

I claim:

1. A coil spring for lateral assembly upon a shaft comprised of two substantially semi-cylindrical units each made of a rod bent to form continuous convolutions and means included in at least one of said units to prevent the convolutions of both units from meshing when said units are assembled upon a shaft.

2. The combination of claim 1 wherein said means includes rods extending axially of said unit and inwardly of the convolutions thereof, the length of said axial rods not exceeding the length of said units in their completely compressed condition.

3. The combination of claim 1 wherein said means includes rods extending axially in opposite directions from diametrically opposite ends of each of said units and inwardly of the convolutions, the length of said rods not exceeding the length of said units in their completely compressed condition, the axial rods of one unit being adapted to abut the corresponding axial rods of the other unit and thereby prevent meshing of the convolutions of one unit with the other.

4. The combination of claim 3 wherein said axial rods of each unit combine to traverse all of the convolutions of the unit when the latter is completely relaxed.

5. In combination with a double-headed shaft, a split sleeve loosely embracing said shaft between said heads and including a shoulder; a coil spring comprised of two substantially semi-cylindrical units positioned laterally around said shaft inwardly of said sleeve with the corresponding ends of said units bearing respectively against said shoulder and one of said shaft heads, each semi-cylindrical unit being made of a rod bent to form continuous convolutions and means included in at least one of said units to prevent the convolutions of both units from meshing.

6. The combination of claim 5 wherein said means includes rods extending axially in opposite directions from diametrically opposite ends of each of said units and inwardly of the convolutions, the length of said rods not exceeding the length of said units in their completely compressed condition, the axial rods of one unit being adapted to abut the corresponding axial rods of the other unit and thereby prevent meshing of the convolutions of one unit with the other.

7. The combination of claim 6 wherein said convolutions include axially spaced, circumferentially extending members joined by axially extending webs, an intermediate circumferentially extending member being integrally connected to adjacent circumferentially extending members on both sides thereof by said webs which extend axially in opposite directions and from the opposite ends of said intermediate member to said adjacent members respectively.

8. A coil spring for lateral assembly upon a shaft comprised of two substantially semi-cylindrical units each made of a rod bent to form continuous convolutions, said convolutions including axially spaced, circumferentially extending members joined by axially extending webs, an intermediate circumferentially extending member being integrally connected to adjacent circumferentially extending members on both sides thereof by said webs which extend axially in opposite directions and from the opposite ends of said intermediate member to said adjacent members respectively.

No references cited.

ARTHUR L. LA POINT, *Primary Examiner.*

R. M. WOHLFARTH, *Assistant Examiner.*